United States Patent

[11] 3,585,300

[72] Inventors Masao Kawashima
Yokohama-shi;
Mikio Ohtsuki, Kawasaki-shi; Isao
Fudemoto, Machida-shi, all of, Japan

[21] Appl. No. 770,613
[22] Filed Oct. 25, 1968
[45] Patented June 15, 1971
[73] Assignee Fujitsu Limited
Kawasaki, Japan
[32] Priority Oct. 31, 1967, Mar. 28, 1968
[33] Japan
[31] 42/70134 and 43/20269

[54] REGENERATIVE REPEATER FOR MULTIVALUED PCM SYSTEM
15 Claims, 5 Drawing Figs.

[52] U.S. Cl. 178/70R, 328/164, 340/347 AD, 340/347 DA
[51] Int. Cl. H03k 13/17, H04l 25/52
[50] Field of Search 178/70; 179/16.4, 15; 328/164; 325/13; 340/347

[56] References Cited
UNITED STATES PATENTS

| | | | |
|---|---|---|---|
| 3,188,624 | 6/1965 | McMillian | 340/347 (AID) |
| 3,255,447 | 6/1966 | Sharples | 340/347 (A/O) |
| 3,320,534 | 5/1967 | Altonji | 179/15 APC |

OTHER REFERENCES
" Analog/Digital Feedback Converter," RCA LECTURE NOTES ON DIGITAL COMMUNICATIONS 1966 edition, p. 38

*Primary Examiner*—Kathleen H. Claffy
*Assistant Examiner*—William A. Helvestine
*Attorneys*—Curt M. Avery, Arthur E. Wilfond, Herbert L. Lerner and Daniel J. Tick ABSTRACT: A regenerative repeater for a multivalued PCM system which transmits a multinary code having $n$ signal amplitude levels comprises $m$ comparator branches having $m$ reference amplitude levels, wherein $$2^{m-1} < n \leq 2^m.$$

A comparator branch includes a comparator for comparing an input signal having a determined amplitude level and including noise with a reference signal in amplitude level and producing an output signal in accordance with the amplitude level relationship of the input and reference signals, the output signal having the determined amplitude level and being free of noise. The input signal to the comparator of the first branch is the input signal supplied by the input and biased by a signal biasing circuit. Each of the branches other than the first comprises a difference circuit for determining the difference between the input signal supplied to the comparator of the next-preceding branch and the output signal of the comparator of the next-preceding branch. Each of the difference circuits has an output connected to the comparator of the corresponding branch. An adding circuit has a plurality of inputs each coupled to the comparator of a corresponding one of the branches and an output providing the output signal. An attenuator is connected in each input of the adding circuit other than the first for attenuating signals supplied to the adding circuit by $1/2^x$, where $x$ is an integer which is 1 in the second branch and increases by 1 in each succeeding branch.

REGENERATIVE REPEATER FOR MULTIVALUED PCM SYSTEM

DESCRIPTION OF THE INVENTION

The present invention relates to a regenerative repeater. More particularly, the invention relates to a regenerative repeater for a multivalued PCM system.

In code transmission, the required bandwidth of a relay transmission line necessary for the transmission of the required information is proportional to the number of time slots which must be transmitted within a constant period of time. Furthermore, if the necessary and sufficient ratio between the signal and noise, or signal to noise ratio, may be obtained in the transmission line, the number of time slots may be decreased as the multinary transmission code is increased. That is, the greater the multinary aspect of the transmission code, the less the time slots. Consequently, the required transmission bandwidth may be reduced.

In a known system, transmission is via a high quality transmission medium having a sufficiently high signal to noise ratio such as, for example, a coaxial transmission line. Coding is performed at a lower degree such as, for example, binary code, so that the speed of any motion is unnecessarily increased and the required transmission band is increased. Consequently, the line loss at the maximum transmission frequency is unnecessarily increased and the interval between the regenerative repeaters is decreased, so that the equipment becomes more expensive.

The foregoing deficiency of increased expense of equipment may be eliminated by a multinary code transmission system which provides multinary code transmission via a high quality transmission medium having a sufficiently high signal to noise ratio as aforedescribed, and which reduces the required transmission bandwidth and permits the lengthening of the interval between the regenerative repeaters or an increase in the amount of information which may be transmitted. A regenerative repeater for a system of such type, however, has not been proposed. A known system comprises comparing circuits of a number equal to the number of levels of the transmission code or of a number one less than the number of levels of the transmission code. The comparing circuits are connected in parallel and the results of the comparisons made by the comparing circuits are discriminated by a logic circuit and the output signals of the logic circuit are regenerated. Such a system has the disadvantage that the greater the multinary code, the greater the number of comparing circuits.

The principal object of the present invention is to provide a new and improved regenerative repeater for a multivalued PCM system.

An object of the present invention is to provide a regenerative repeater for a multivalued PCM system, which repeater avoids the disadvantages of prior art repeaters.

An object of the present invention is to provide a regenerative repeater for a multivalued PCM system, in which the number of circuits does not increase with an increased multinary code.

An object of the present invention is to provide a regenerative repeater for a multivalued PCM system, which repeater functions with efficiency, effectiveness and reliability and is economical in operation and cost.

In accordance with the present invention, a regenerative repeater for a multivalued PCM system which transmits a multinary code having $n$ signal amplitude levels comprises $m$ comparator means having $m$ reference amplitude levels, wherein $$2^{m11}aAn \leqq 2^m.$$

One of the comparator means includes a comparator for comparing an input signal with a reference signal in amplitude level and producing an output signal in accordance with the amplitude level relationship of the input and reference signals. Input means supplies an input signal having a determined amplitude level and including noise to the comparator means.

Output means connected to the comparator means provides an output signal having the determined amplitude level and free of noise.

In accordance with the present invention, a regenerative repeater for a multivalued PCM system which transmits a multinary code having $n$ signal amplitude levels comprises a signal holding circuit for storing an input signal at constant amplitude for a determined time. Input means supplies an input signal having a determined amplitude level and including noise to the signal holding circuit. A clock pulse generator produces a plurality of clock pulses having a repetition rate equal to that of the input signal and clock pulses having a repetition rate equal to $m+1$ times the repetition rate of the input signal, wherein $$2^{m11}aAn \leqq 2^m$$

$m$ being a positive integer. A comparison signal circuit coupled to the clock pulse generator produces a plurality of quantized levels with a predetermined level, each of the quantized levels comprising a comparison signal having an amplitude level determined by a clock pulse having a repetition rate which is $m+1$ times the repetition rate of the input signal. The comparison signal circuit initially produces a comparison signal of determined constant amplitude level. A comparator having an input coupled to the signal holding circuit and to the comparison signal circuit compares the input signal stored in the signal holding circuit and a comparison signal produced by the comparison signal circuit in amplitude level and produces an output signal in accordance with the amplitude relationship of the input and comparison signals. The comparator has an output coupled to the comparison signal circuit for supplying the output signal of the comparator to the comparison signal circuit to control the production by the comparison signal circuit of a comparison signal having an amplitude level which is nearest that of the input signal in magnitude. The comparator compares the input signal and a comparison signal $m$ times for a single input signal and the output signal thereof by the clock pulses. Output means connected to the comparison signal circuit provides an output signal having the determined amplitude level and free of noise.

Further in accordance with the present invention, a regenerative repeater for a multivalued PCM system which transmits a multinary code having $n$ signal amplitude levels comprises input means for supplying an input signal having a determined amplitude level and including noise. A signal biasing circuit connected to the input means applies a constant amplitude level bias to the input signal. There are $m$ circuit branches connected to the signal biasing circuit, wherein $$2^{m11} < n \leqq 2^m.$$

Each of the circuit branches comprises a comparator for comparing an input signal with a comparison signal having a determined amplitude level and producing an output signal in accordance with the amplitude relationship of the input and comparison signals. The input signal to the comparator of the first of the circuit branches is the input signal supplied by the input means and biased by the signal biasing circuit. Each of the circuit branches other than the first comprises different circuit means for determining the difference between the input signal supplied to the comparator of the next-preceding circuit branch and the output signal of the comparator of the next-preceding circuit branch. Each of the difference circuit means has an output connected to the comparator of the corresponding circuit branch. Output means coupled in common to the comparator of each of the circuit branches provides an output signal having the determined amplitude level and free of noise.

The comparison signal with which the input signal is compared in the comparator of each of the circuit branches may have twice the amplitude level of the comparison signal of the next-preceding circuit branch or may have an amplitude level which is different from those of the others. The output means may comprise an adding circuit having a plurality of inputs each coupled to the comparator of a corresponding one of the circuit branches and an output providing the output signal, and delay means interposed between selected ones of the comparators and the corresponding inputs of the adding circuit. The difference circuit means of each of the circuit branches other than the first may comprise a difference amplifier for determining the difference between the input signal supplied to the comparator of the next-preceding circuit branch and the output signal of the comparator of the next-preceding circuit branch and doubling the amplitude level of the difference.

Each of the circuit branches may further comprise a signal holding circuit for storing the input signal supplied to the comparator of the corresponding circuit branch and to the difference circuit means of the next-succeeding circuit branch. The signal holding circuit of the first circuit branch is connected between the signal biasing circuit and the comparator of the first circuit branch and the signal holding circuit of each of the other circuit branches is connected between the difference circuit means and the comparator of the corresponding circuit branch. Each of the circuit branches other than the first may further comprise delay means connected in an input of the difference circuit means of the corresponding circuit branch for supplying the input signal simultaneously with the output signal of the comparator of the next-preceding circuit branch. The output means may comprise an adding circuit having a plurality of inputs each coupled to the comparator of a corresponding one of the circuit branches and an output providing the output signal, and attenuating means connected in each input of the adding circuit other than the first for attenuating signals supplied to the adding circuit by $½^x$, where $x$ is an integer which is 1 in the second circuit branch and increases by 1 in each succeeding circuit branch.

In accordance with the present invention, a method of regeneratively repeating an input signal having a determined amplitude level and including noise in a multivalued PCM system which transmits a multinary code having $n$ signal amplitude levels comprises the steps of applying a constant amplitude level bias to the input signal. In each of $m$ circuit branches, wherein $$2^{m11}aAn \leq 2^m,$$

an input signal is compared with a comparison signal having a determined amplitude level and an output signal is produced in accordance with the amplitude relationship of the input and comparison signals. In the first of the circuit branches the biased input signal is compared. In each of the circuit branches other than the first, the difference between the input signal compared in the next-preceding circuit branch and the comparison output signal of the next-preceding circuit branch are compared. The comparison output signals of all the circuit branches provide in common an output signal having the determined amplitude level and free of noise. The comparison signals in each of the circuit branches may have twice the amplitude level of the comparison signal of the next-preceding circuit branch or the comparison signal of each of the circuit branches may have an amplitude level which is different from those of the others.

In order that the present invention may be readily carried into effect, it will now be described with reference to the accompanying drawings, wherein.

Figure 1:
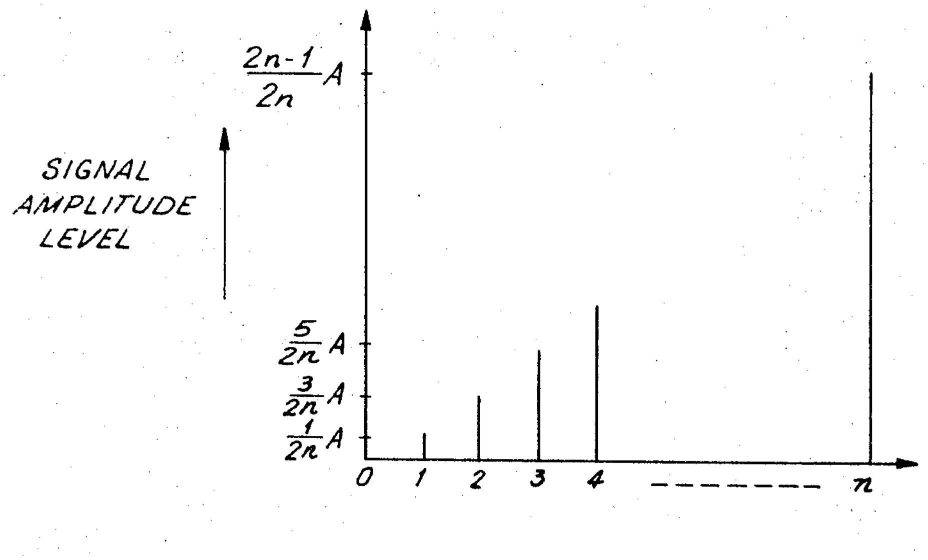
FIG. 1 is a graphical presentation of the signal amplitude levels of the signals of FIG. 2.

In FIG. 1, the signal amplitude levels of a multinary code of $n$ degree, or $n$-nary code, transmitted in accordance with the present invention, are indicated by the ordinate. In FIG. 1, the maximum signal amplitude level is $$\frac{2n-1}{2n}A$$

and the minimum signal amplitude level is $$\frac{1}{2n}A.$$

. The interval between adjacent signal amplitude levels is $1/n$.

Figure 2:
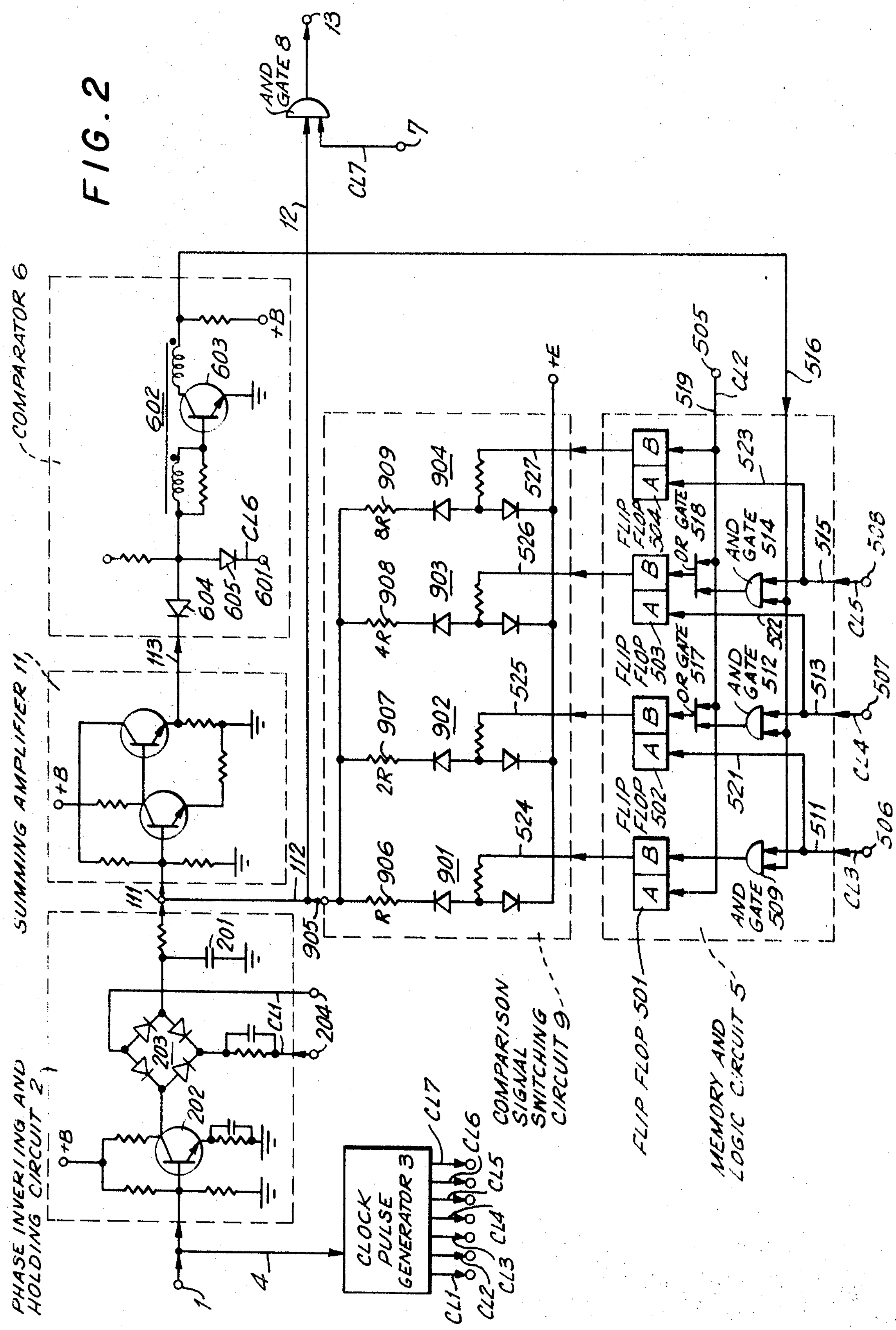
FIG. 2 is a circuit diagram of an embodiment of the regenerative repeater of the present invention.

In a first example of the operation of the system of FIG. 2 of the present invention, it will be assumed that $n$ equals 8, so that the transmitted multinary code is an octinary code. The signal amplitude levels of the octinary code are therefore (1/16)A, (3/16)A, ...... (11/16)A, (13/16)A and (15/16)A. When a zero level is utilized the bias may be determined by the first part of the regenerative repeater.

A signal which has been distorted in the transmission line is supplied to an input terminal 1 of the regenerative repeater of FIG. 2. The waveforms of the input signal are equalized by an equalizing and preamplifying circuit, which is not shown in FIG. 2 and is well known. The center value of the equalized waveforms is utilized for sampling and the phase of the signal is inverted in a phase inverting and holding circuit 2. The inverted signal is stored in a holding capacitor 201 of the phase inverting and holding circuit 2. A transistor 202 inverts the phase of the input signal. The emitter electrode of the transistor 202 is connected to ground. The storage or holding of the inverted signal by the capacitor 21 is controlled via a diode switch 203 and a clock pulse CL1 which is supplied to the phase inverting and holding circuit 2 via a clock pulse input terminal 204.

In the digital transmission of the present invention, it is necessary to provide synchronizing signals which indicate pulse positions and which are referred to as bit synchronization. The synchronizing signals are derived from the input signal supplied to the input terminal 1 or are transmitted via separate transmission channels. In the present invention, the synchronizing signals are utilized to provide clock pulses CL1 to CL7. The clock pulses CL6 have a repetition rate or frequency which is equal to $m$+1 times the repetition rate or frequency of the clock pulses. In the embodiment of FIG. 2, $m$=3. In FIG. 2, a clock pulse generator 3 has an input connected to the input terminal 1 via a lead 4 and produces clock signals CL1 to CL7 at a plurality of corresponding output terminals.

During the time that the phase of the input signal is inverted and the inverted signal is stored in the phase inverting and holding circuit 2, the stable conditions or states of the flip-flop circuits 501, 502, 503 and 504 of a memory and logic circuit 5 are determined by the clock pulse CL2 which is supplied from the corresponding output terminal of the clock pulse generator 3 to an input terminal 505 of said memory logic circuit 5. In FIG. 2, the clock pulse CL3 is supplied from the corresponding output terminal of the clock pulse generator 3 to an input terminal 506 of the memory and logic circuit 5. The clock pulse CL4 is supplied from the corresponding output terminal of the clock pulse generator 3 to an input terminal 507 of the memory and logic circuit 5. The clock signal CL5 is supplied from the corresponding output terminal of the clock pulse generator 3 to an input terminal 508 of the memory and logic circuit 5. The clock pulse CL6 is supplied from the corresponding output terminal of the clock pulse generator 3 to an input terminal 601 of a comparator 6. The clock pulse CL7 is supplied from the corresponding output terminal of the clock pulse generator 3 to an input terminal 7 of an AND gate 8.

In FIG. 2, in the memory and logic circuit 5, the input terminal 506 is connected to one input of an AND gate 509 via a lead 511. The input terminal 507 is connected to one input of an AND gate 512 via a lead 513. The input terminal 508 is connected to one input of an AND gate 514 via a lead 515. The other input of each of the AND gates 509, 512 and 514 of the memory and logic circuit 5 is connected via a common lead 516 to the output of the comparator 6. The output of the AND gate 509 is connected to the reset input of the flip-flop 501. The output of the AND gate 512 is connected to an input of an OR gate 517. The output of the AND gate 514 is connected to an input of an OR gate 518.

The output of the OR gate 517 is connected to the reset input of the flip-flop 502. The output of the OR gate 518 is connected to the reset input of the flip-flop 503. The input terminal 505 is connected to the set input of the flip-flop 501, to the reset input of the flip-flop 504, to the other input of the OR gate 517 and to the other input of the OR gate 518 via a common lead 519. The input terminal 506 is connected to the set inset of the flip-flop 502 via the lead 511 and a lead 521. The input terminal 507 is connected to the set input of the flip-flop 503 via the lead 513 and a lead 522. The input terminal 508 is connected to the set input of the flip-flop 504 via the lead 515 and a lead 523.

It is thus evident from FIG. 2 that, in the memory and logic circuit 5, the first flip-flop 501 is switched to its set condition A by the clock pulse CL2, whereas the second, third and fourth flip-flops 502, 503 and 504 are switched to their reset condition B by said clock pulse. A comparison signal switching circuit 9 has a plurality of switches 901, 902, 903 and 904, each of which is operated when the corresponding flip-flop of the memory and logic circuit 5 is switched to its set condition A. The switch 901 is connected to the reset output of the flip-flop 501 via a lead 524. The switch 902 is connected to the reset output of the flip-flop 502 via a lead 525. The reset output of the flip-flop 503 is connected to the switch 903 via a lead 526. The reset output of the flip-flop 504 is connected to the switch 904 via a lead 527. The switch 901 is connected to an output terminal 905 of the comparison signal switching circuit 9 via a resistor 906. The switch 902 is connected to the output terminal 905 via a resistor 907. The switch 903 is connected to the output terminal 905 via a resistor 908. The switch 904 is connected to the output terminal 905 via a resistor 909.

It is thus shown in FIG. 2 that only the switch 901 is operated by the clock pulse CL2, so that only the resistor 906 is connected into the circuit and a signal (1/2)A is provided at the output terminal 905 as the comparison signal. The resistance value of the resistor 906, as well as the resistance value of the resistors 907, 908 and 909, which are twice, four times, and eight times that of the resistor 906, as well as the voltage magnitude of a DC voltage source +E, are determined for the aforedescribed operation.

In FIG. 2, the comparison signal provided by the comparison signal switching circuit 9 is supplied to an input terminal 111 of a summing amplifier 11 via a lead 112 from the output terminal 905. The summing amplifier 11 functions to add the comparison signal produced by the comparison signal switching circuit 9 and the inverted input signal produced by the phase inverting and holding circuit 2. The input of the comparator 6 is connected to the output of the summing amplifier 11 via a lead 113. The comparator 6 functions to determine the polarity of the resultant sum provided by the summing amplifier 11. The comparator 6 comprises a blocking oscillator which includes a transformer 602, a transistor 603, a diode 604 and a diode 605.

If a positive signal is supplied to the input of the comparator 6 via the lead 113 simultaneously with a clock pulse CL6 supplied to the input terminal 601, the diodes 604 and 605 are switched to their nonconductive condition, so that the blocking oscillator operates and produces an output pulse. If a negative signal is supplied to the comparator 6 via the lead 113 simultaneously with a clock pulse CL6 supplied to the input terminal 601, the diode 604 is switched to its conductive condition and the blocking oscillator is not operated, so that there is no output pulse generated by said oscillator. If no clock pulse CL6 is supplied to the input terminal 601, the diode 605 is switched to its conductive condition and the blocking oscillator is not operated, so that no output pulse is provided by said oscillator. Thus, when the comparison signal provided by the comparison signal switching circuit 9 is smaller in magnitude than the inverted input signal, the signal produced by the summing amplifier 11 is negative and there is no output pulse produced by the comparator 6, so that there is no signal supplied via the lead 516 to the memory and logic circuit 5. When the comparison signal produced by the comparison signal switching circuit 9 is greater in magnitude than the input signal, the signal produced by the summing amplifier 11 is positive and the comparator 6 produces an output pulse which is supplied to the memory and logic circuit 5 via the lead 516.

The output pulse produced by the comparator 6 is supplied to the AND gates 509, 512 and 514 of the memory and logic circuit 5 via the common lead 516. When the clock pulse CL3 is supplied to the input terminal 506, the flip-flop 502 is switched to its set condition A and the switch 902 of the comparison signal switching circuit 9 is operated, so that the resistor 907 is connected into the circuit. If an output pulse is produced by the comparator 6 at such time, the AND gate 509 is switched to its conductive condition, so that the flip-flop 501 is switched to its reset condition thereby cutting off the switch 901 and disconnecting the resistor 906 from the circuit. The comparison signal then produced by the comparison signal switching circuit 9 has an amplitude level of (1/4)A. If no output pulse is produced by the comparator 6 at such time, the AND gate 509 is not switched to its conductive condition, but remains in its nonconductive condition, so that the flip-flop 501 remains in its set condition and the resistor 906 remains connected in the circuit and the comparison signal produced by the comparison signal switching circuit 9 has an amplitude level of (3/4)A.

The comparison signal is repeatedly provided in the aforedescribed manner and has an amplitude level of (1/16)A, (3/16)A, (5/16)A, (7/16)A, (9/16)A, (11/16)A, (13/16)A or (15/16)A, which comparison signal is provided at the output terminal 905 as the fourth comparison signal. Therefore, if the clock signal CL7 is supplied to the input of the AND gate 8 via the input terminal 7 simultaneously with the provision of the comparison signal, said comparison signal is regeneratively relayed via a lead 12, the other input of said AND gate, said AND gate and an output terminal 13, as the multinary PCM signal.

An illustrative example will now be presented for an input signal having an amplitude level of (7/16)A±Z. The input signal is supplied to the input terminal 1 of FIG. 2. In the signal, Z is the noise in the transmission line. The object of the regenerative repeater of FIG. 2 is to eliminate the influence of the noise Z, which is smaller in amplitude level than (1/16)A. If the noise Z is greater in amplitude level than (1/16)A, it may be mistaken for the next amplitude level. The phase inverting and holding circuit 2 stores the input signal (7/16)A±Z as −(7/16)A±Z. The inverted stored signal −(7/16)A±Z is compared by the comparator 6 with the first comparison signal (1/2)A produced by the comparison signal switching circuit 9. Since the input signal is smaller than the comparison signal (1/2)A in absolute value, the comparator 6 produces an output pulse which is supplied to the memory and logic circuit 5 via the lead 516.

A second comparison signal (1/4)A is thus next produced by the comparison signal switching circuit 9. Since the stored inverted input signal −(7/16)A±Z is greater in absolute magnitude than the comparison signal level (1/4)A, the resistor 907 of the comparison signal switch circuit 9 is maintained in the circuit during the supply of the clock pulse CL4 to the input terminal 507. The resistor 907 and the resistor 908 are thus connected in the circuit when the clock pulse CL4 is supplied to the input terminal 507, so that the comparison signal switching circuit 9 produces a comparison signal having an amplitude level of (3/8)A.

Since the stored inverted input signal −(7/16)A±Z is greater in absolute magnitude than the comparison signal (3/8)A, the resistors 907, 908 and 909 are connected in the comparison signal switching circuit 9 during the supply of the clock pulse CL5 to the input terminal 508. The comparison signal thus produced by the comparison signal switching circuit 9 is (1/4)A+(1/8)A+(1/16)A, which is equal to (7/16)A. If the comparison signal (7/16)A is provided at the output terminal 13, the result of the operation of the embodiment of FIG. 2 is that the input signal (7/16)A±Z is regenerated as the output signal (7/16)A which is free of noise.

Figure 4:
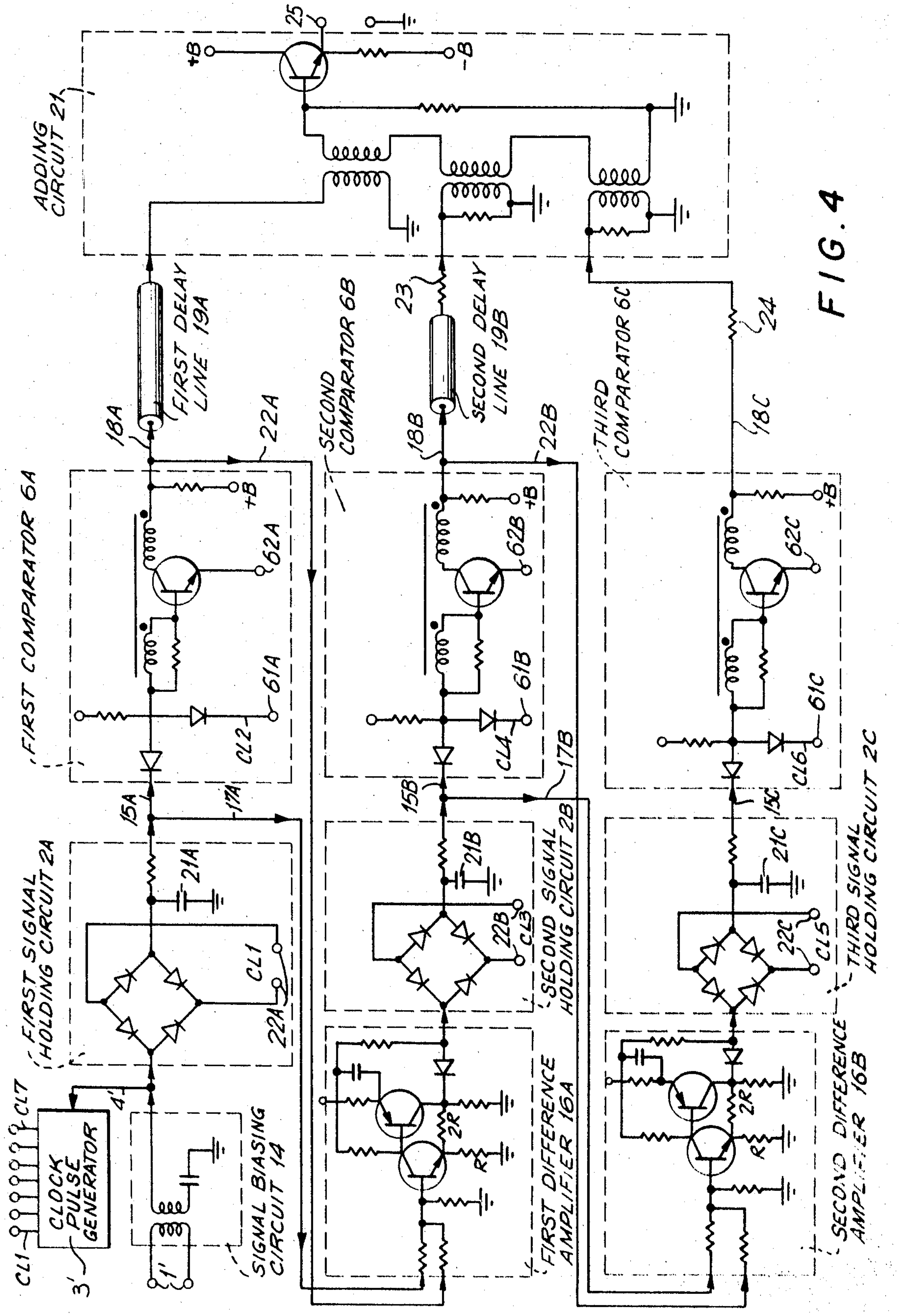
FIG. 4 is a circuit diagram of another embodiment of the regenerative repeater of the present invention.

In another embodiment of the regenerative repeater of the present invention, as shown in FIG. 4, a biasing circuit provides a constant bias to the input signal. A number $m$ of circuit branches are utilized. The number $m$ is a positive integer which satisfies the relation $2^{m-1}<n\leqq 2^m$, where $n$ is the degree of the multinary transmitted code. Delay circuits simultaneously supply the output signals of the circuit branches to an adding circuit which adds the output signals of all the circuit branches. Each circuit branch comprises a comparator for comparing the input signal supplied to the circuit branch with a predetermined reference signal. The comparator produces or does not produce a pulse having a predetermined amplitude level depending upon the result of the comparison by the comparator. Each circuit branch also includes a difference circuit for determining the difference between the input signal supplied to the comparator of the next-preceding circuit branch and the output signal produced by the comparator of the next-preceding circuit branch. The first circuit branch does not require a difference circuit. The output signal produced by the adding circuit is the regeneratively repeated waveform.

Figure 3:
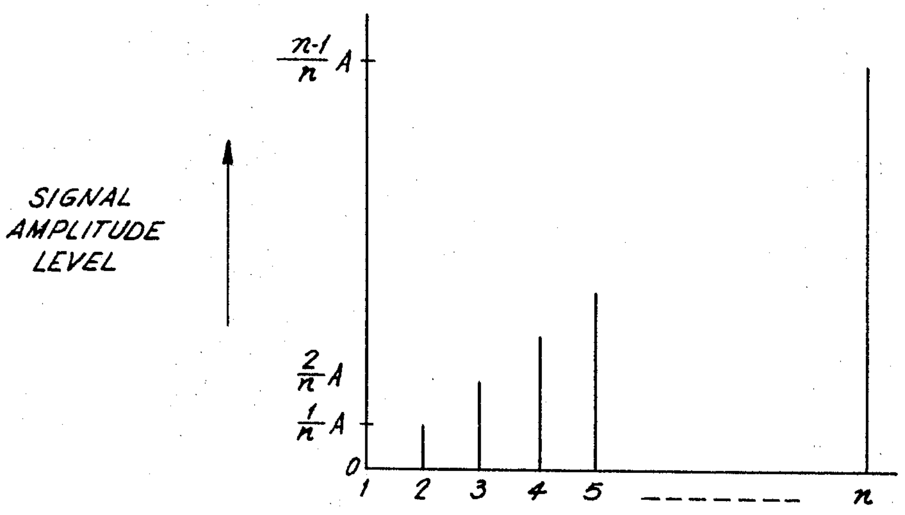
FIG. 3 is a graphical presentation of the signal amplitude levels of the signals of FIG. 4.

FIG. 3 illustrates the amplitude levels of a multinary code of $n$ degree, or $n$-nary code signals, transmitted via a transmission system in accordance with the present invention. As indicated by the ordinate of FIG. 3, which indicates the signal amplitude level of each of the multinary code signals, the maximum signal amplitude level is $$\frac{n-1}{n}A$$

and the minimum signal amplitude level is zero. The interval between adjacent signal amplitude levels is $(1/n)$A.

For illustrative purposes, it is assumed that $n$ equals 8, so that the multinary code is an octinary code. The operation of the embodiment of FIG. 4 is described with reference to an octinary code. The eight signal levels of the code are thus (1/8)A, (2/8)A, (3/8)A, (4/8)A, (5/8)A, (7/8)A. The zero signal is also utilized.

In FIG. 4, the input signal is supplied to input terminals 1'. The input terminals 1' are connected to the input of a signal biasing circuit 14. The output of the signal biasing circuit 14 is connected to the input of a first signal holding circuit 2A and is also connected to the input of a clock pulse generator 3' via a lead 4'. The clock pulse generator 3' functions in the same manner as the clock pulse generator 3 of FIG. 2 to produce clock signals CL1 to CL7. The signal biasing circuit 14 applies a bias of (1/16)A to the input signal.

The input signal, biased to (1/16)A, is supplied to the first signal holding circuit 2A. Since the input signal is biased by (1/16)A, if there is no noise in the input signal, the amplitude level or magnitude of the signal is one of (1/16)A, (3/16)A, (5/16)A, (7/16)A, (9/16)A, (11/16)A, (13/16)A, (15/16)A. The first signal holding circuit 2A stores the input signal in its storage capacitor 21A.

The stored input signal of the holding circuit 2A is supplied to the input of a first comparator 6A via a lead 15A and is also supplied to the input of a first difference amplifier 16A via a lead 17A. The first comparator 6A is the same as the comparator 6 of FIG. 2. The output of the first comparator 6A is supplied via a lead 18A and a first delay line 19A to an input of an adding circuit 21. The output of the first comparator 6A is also supplied to another input of the first difference amplifier 16A via a lead 22A.

The output of the first difference amplifier 16A is supplied to the input of a second signal holding circuit 2B. The output of the second signal holding circuit 2B is supplied to the input of a second comparator 6B via a lead 15B and is also supplied to an input of a second difference amplifier 16B via a lead 17B. The output of the second comparator 6B is supplied to another input of the adding circuit 21 via a lead 18B, a second delay line 19B and a resistor 23. The output of the second comparator 6B is also supplied to another input of the second difference amplifier 16B via a lead 22B.

The output of the second difference amplifier 16B is supplied to the input of a third signal holding circuit 2C. The output of the third signal holding circuit 2C is supplied to the input of a third comparator 6C via a lead 15C. The output of the third comparator 6C is supplied to another input of the adding circuit 21 via a lead 18C and a resistor 24. The clock signal CL1 is supplied from the corresponding output terminal of the clock pulse generator 3' to input terminals 22A of the first signal holding circuit 2A. The clock pulse CL2 is supplied from the corresponding output terminal of the clock pulse generator 3' to an input terminal 61A of the first comparator 6A. The clock pulse CL3 is supplied from the corresponding output terminal of the clock pulse generator 3' to input terminals 22B of the second signal holding circuit 2B. The clock pulse CL4 is supplied from the corresponding output terminal of the clock pulse generator 3' to an input terminal 61B of the second comparator 6B. The clock signal CL5 is supplied from the corresponding output terminal of the clock pulse generator 3' to input terminals 22C of the third signal holding circuit 2C. The clock pulse CL6 is supplied from the corresponding output terminal of the clock pulse generator 3' to an input terminal 61C of the third comparator 6C.

The first and second delay lines 19A and 19B function to supply signals to the inputs of the adding circuit 21 simultaneously. The first comparator 6A includes a reference signal terminal 62A. The second comparator 6B includes a reference signal terminal 62B. The third comparator 6C includes a reference signal terminal 62C. Each of the first and second difference amplifiers 16A and 16B is the same as the other and provides an amplification of two. Each of the resistors 23 and 24 functions as a single attenuator. Each of the first, second and third signal holding circuits 2A, 2B and 2C is the same as the others. Each of the first, second and third comparators 6A, 6B and 6C is the same as the others. The adding circuit 21 has an output terminal 25. Each of the components of the embodiment of FIG. 4, as each of the components of the embodiment of FIG. 2, comprises a known circuit for performing the indicated operation or function.

In order to illustrate the operation of the embodiment of FIG. 4, it is assumed that the input signal has an amplitude level of (6/8)A±Z. Z is the noise of the input signal received via the transmission line and is smaller than (1/16)A. The input signal is biased by (1/16)A by the signal biasing circuit 14 so that it becomes (13/16)A±Z. The biased signal is then supplied by the signal biasing circuit 14 to the first signal holding circuit 2A, where it is stored. The stored, biased input signal (13/16)A±Z is supplied to the first comparator 6A. A comparison signal having an amplitude level of (1/2)A is always supplied to the reference or comparison signal terminal 62A of the first comparator 6A.

The first comparator 6A functions to compare the signal $\frac{13}{16}A+Z$ with the comparison signal $\frac{1}{2}A$ at an instant determined by the clock signal CL2 supplied to the input terminal 61A. If the result of the comparison indicates that the biased, stored input signal (13/16)A±Z is greater in magnitude than the comparison signal supplied to the reference signal 62A, the first comparator 6A produces an output signal or pulse having an amplitude level (1/2)A. If the biased, stored input signal is less than the comparison signal supplied to the reference or comparison signal terminal 62A, there is no output signal or pulse produced by the first comparator 6A.

The output signal of the first signal holding circuit 2A is $\frac{13}{16}A+Z$ and this is greater in magnitude than the comparison signal $\frac{1}{2}A$ supplied to the reference signal terminal 62A, so that the first comparator 6A produces an output pulse having an amplitude level (1/2)A. The output pulse (1/2)A produced by the first comparator 6A is supplied to the first delay line 19A and to an input of the first difference amplifier 16A. The biased, stored input signal (13/16)A±Z is also supplied to an input of the first difference amplifier 16A, so that the difference between the signals (13/16)A±Z and (1/2)A is determined by said first difference amplifier. After the first difference amplifier 16A determines the difference between the output signal of the first comparator 6A and the biased, stored input signal from the first signal holding circuit 2A, it multiples such difference by two. Thus, $$\frac{13}{16}A\pm Z-\left(\frac{1}{2}A\right)=\frac{13}{16}A\pm Z-\left(\frac{8}{16}A\right)$$
$$=\frac{8}{16}A\pm Z \text{ and } (2)\left(\frac{8}{16}A\pm Z\right)=\frac{10}{16}A\pm 2Z$$

so that the first difference amplifier 16A produces an output signal (10/16)A±Z.

The output signal of the first difference amplifier 16A is stored by the storage capacitor 21B of the second signal holding circuit 2B to which it is supplied. The stored signal $^{10}/_{16}\ A+2Z$ is compared with a comparison or reference signal (1/2)A, supplied to the reference signal terminal 62B by the second comparator 6B under the control of the clock pulse CL4 which is supplied to the input terminal 61B of said second comparator. The second comparator 6B functions in the same manner as the first comparator 6A. Since the signal $^{10}/_{16}\ A\pm 2Z$ of the second signal holding circuit $2B$ is greater in magnitude than (1/2)A, the second comparator 6B produces an output pulse or signal having an amplitude level of (1/2)A. The output signal (1/2)A produced by the second comparator 6B is supplied to the second delay line 19B is also supplied to an input of the second difference amplifier 16B.

Since the output signal of the second signal holding circuit 2B is also supplied to an input of the second difference amplifier 16B, said second difference amplifier determines the difference between the stored signal $^{10}/_{16}\ A\ 2Z$ and the output signal (1/2)A of the second comparator 6B. The difference is then doubled by the second difference amplifier 16B. Thus, $$\frac{10}{16}A\pm 2Z-\left(\frac{1}{2}A\right)=\frac{10}{16}A\pm 2Z-\left(\frac{8}{16}A\right)$$
$$=\frac{2}{16}A\pm 2Z \text{ and } (2)\left(\frac{2}{16}A\pm 2Z\right)=\frac{4}{16}A\pm 4Z$$

so that the second difference amplifier 16B produces an output signal of (4/16)A±4Z.

The output signal (4/16)A±4Z produced by the second difference amplifier 16B is supplied to the third signal holding circuit 2C, where it is stored by the storage capacitor 21C. The stored signal (4/16)A±4Z is supplied to the third comparator 6C, where it is compared with the reference or comparison signal (1/2)A supplied to the reference or comparison signal terminal 62C under the control of the clock signal CL6 supplied to the input terminal 61C. The operation of the third comparator 6C is the same as that of each of the first and second comparators 6A and 6B. Since the stored signal $^{4}/_{16}\ A\pm 4Z$ is smaller in magnitude than $^{1}/_{2}\ A$, the third comparator 6C produces no output pulse.

When operation of the three circuit branches of the circuit arrangement of FIG. 4 is completed, and an output pulse is produced by the comparator of the last circuit branch, the outputs of the comparators of the three stages are added by the adding circuit 21. The resistor 23 functions to divide the output signal (1/2)A of the second comparator 6B by two, so that the signal supplied to the adding circuit 21 via the second delay line 19B is (1/4)A. The resistor 24 functions to divide the output signal produced by the third comparator 6C by four, so that the output signal (1/2)A is attenuated to (1/8)A before it is supplied to the adding circuit 21.

In the present illustrative example, therefore, each of the first and second circuit branches produces an output signal and no output signal is produced by the third or last stage. The adding circuit 21 adds the output signal (1/2)A produced by the first comparator 6A and the attenuated output signal (1/4)A supplied by the second comparator 6B and produces an output resultant signal of (6/8)A. The output signal (6/8)A is provided at the output terminal 25 of the adding circuit 21. The input signal (6/8)A±Z is thus regenerated to (6/8)A free of noise. The embodiment of FIG. 4 thus functions to eliminate the noise Z.

If an input signal (5/8)A±Z is supplied to the input terminals 1' of FIG. 4, the signal biasing circuit 14 biases said input signal by (1/16)A, so that said signal biasing circuit supplies a biased input signal of (11/16)A±Z to the first signal holding circuit 2A. The result of the comparison by the first comparator 6A of the biased, stored input signal (11/16)A±Z and the reference or comparison signal (1/2)A is the production of an output pulse (1/2)A by said first comparator. The first difference amplifier 16A determines the difference between the biased, stored input signal (11/16)A±Z and the output signal (1/2)A of the first comparator 6A and multiplies the resultant difference by two. Thus, the output signal produced by the first difference amplifier 16A is (6/16)A±2Z. This is determined as follows:

$$\frac{11}{16}A\pm Z-\left(\frac{1}{2}A\right)=\frac{11}{16}A\pm Z-\left(\frac{8}{16}A\right)$$
$$=\frac{3}{16}A\pm Z \text{ and } (2)\left(\frac{3}{16}A\pm Z\right)=\frac{6}{16}A\pm 2Z$$

The output signal (6/16)A±2Z produced by the first difference amplifier 16A is stored in the second signal holding circuit 2B and is compared by the second comparator 6B with the reference or comparison signal (1/2)A. Since the comparison signal (1/2)A is greater than the signal (6/16)A±2Z there is no output pulse produced by the second comparator 6B. There is therefore no signal supplied to the second difference amplifier 16B from the second comparator 6B. The stored signal (6/16)A±2Z, however, is supplied from the second signal holding circuit 2B to the second difference amplifier 16B.

The second difference amplifier 16B produces an output signal of $^{12}/_{16}\ A\pm 4Z$, which is two times the signal $^{6}/_{16}\ A\pm 2Z$ minus zero. The signal $^{12}/_{16}\ A\pm 4Z$ is stored in the third signal holding circuit 2C and is compared by the third comparator 6C with the reference or comparison signal $^{1}/_{2}\ A$. Since the signal $^{12}/_{16}\ A\pm 4Z$ *is greater in magnitude* than the comparison signal (1/2)A, the third comparator 6C produces an output pulse having an amplitude level of (1/2)A. The output pulse (1/2)A of the third comparator 6C is attenuated by the resistor 24 four times, so that it becomes (1/8)A. The adding circuit 21 thus adds the output signal (1/2)A of the first comparator 6A and the attenuated output signal (1/8)A of the third comparator 6C and produces a resultant output signal having an amplitude level of (5/8)A at the output terminal 25. The regenerative signal is thus (5/8)A and is free of noise.

Figure 5:
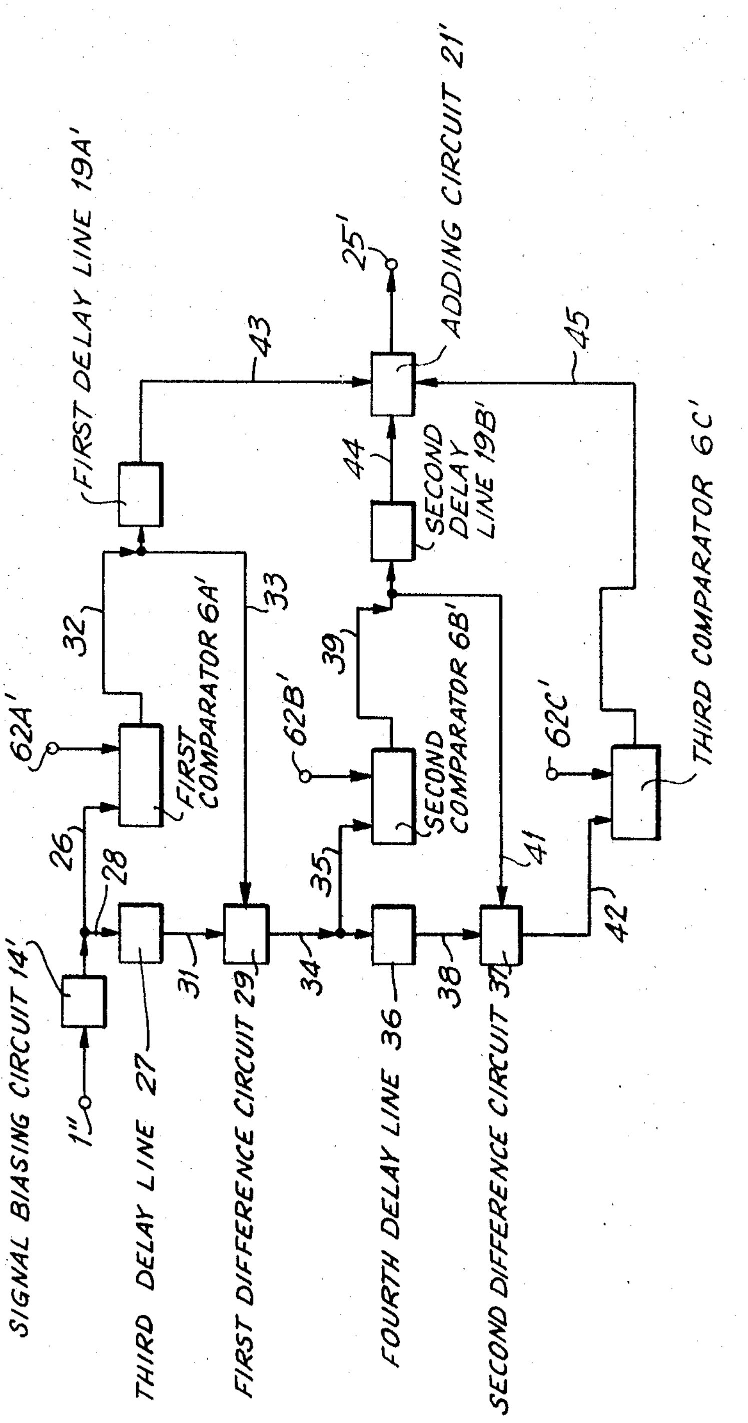
FIG. 5 is a block diagram of a modification of the embodiment of FIG. 4.

FIG. 5 is a modification of the embodiment of FIG. 4, in which the first and second signal holding circuits of FIG. 4 are replaced by third and fourth delay lines, respectively. Another difference in the modification of FIG. 5 is that a comparison or reference signal having an amplitude level of (1/2)A is supplied to the first comparator 6A' via an input or reference signal terminal 62A'. A comparison or reference signal having an amplitude level (1/4)A is supplied to the second comparator 6B' via an input terminal 62B'. A comparison or reference signal having an amplitude level (1/8)A is supplied to the third comparator 6C' via an input terminal 62C'. The modification of FIG. 5 thus permits the utilization of simple difference circuits instead of the difference amplifiers utilized in FIG. 4.

In FIG. 5, the input terminal 1'' is connected to the input of the signal biasing circuit 14' and the output of said signal biasing circuit is connected to an input of the first comparator 6A'.

via a lead 26 and to the input of the third delay line 27 via a lead 28. The output of the third delay line 27 is connected to an input of a first difference circuit 29 via a lead 31. The output of the first comparator 6A′ is connected to the input of the first delay line 19A′ via a lead 32 and to another input of the first difference circuit 29 via a lead 33. The output of the first difference circuit 29 is connected to an input of the second comparator 6B′ via a lead 34 and a lead 35 and is connected to the input of the fourth delay line 36 via the lead 34.

The output of the fourth delay line 36 is connected to an input of a second difference circuit 37 via a lead 38. The output of the second comparator 6B′ is connected to the input of the second delay line 19B′ via a lead 39 and to another input of the second difference circuit 37 via a lead 41. The output of the second difference circuit 37 is connected to an input of the third comparator 6C′ via a lead 42. The output of the first delay line 19A′ is connected to an input of the adding circuit 21′ via a lead 43. The output of the second delay line 19B′ is connected to an input of the adding circuit 21′ via a lead 44. The output of the third comparator 6C′ is directly connected to an input of the adding circuit 21′ via a lead 45. The adding circuit 21′ has an output terminal 25′.

The output signal or pulse produced by the first comparator 6A′ of FIG. 5 is (1/2)A. The output signal or pulse produced by the second comparator 6B′ of FIG. 5 is (1/4)A. The output signal or pulse produced by the third comparator 6C′ of FIG. 5 is (1/8)A. The modification of FIG. 5 thus eliminates the need for the attenuating resistors 23 and 24 of FIG. 4.

If an input signal having an amplitude level of (5/8)A±Z is supplied to the input terminal 1″ of FIG. 5, the signal biasing circuit 14′ biases said input signal by (1/16)A, so that the biased input signal is (11/16)A±Z. The biased input signal (11/16)A±Z is supplied to the third delay line 27 and to the first comparator 6A′. The first comparator 6A′ compares the biased input signal (11/16)A±Z with the comparison signal (1/2)A. Since the biased input signal (11/16)A±Z is greater in magnitude than the comparison or reference signal (1/2)A, the first comparator 6A′ produces an output signal having an amplitude level of (1/2)A. The output signal (1/2)A of the first comparator 6A′ is supplied to the first delay line 19A′ and to the first difference circuit 29.

The biased and delayed input signal (11/16)A±Z is supplied from the third delay line 27 to the first difference circuit 29, which determines the difference between said biased, delayed signal and the output pulse of the first comparator 6A′. These signals are supplied to the first difference circuit 29 simultaneously by suitable adjustment of the delay time of the third delay line 27. The resultant difference signal produced by the first difference circuit 29 is (3/16)A±Z. This is determined as follows:

$$\frac{11}{16}A\pm Z-\left(\frac{1}{2}A\right)=\frac{11}{16}A\pm Z-\left(\frac{8}{16}A\right)=\frac{3}{16}A\pm Z$$

The output signal produced by the first difference circuit 29 is supplied via the fourth delay line 36 to the second difference circuit 37 and is also supplied directly to the second comparator 6B′. The second comparator 6B′ compares the signal (3/16)A±1/4)A.

Since the comparison signal (1/4)A is greater in magnitude than the signal (3/16)A±Z, the second comparator 6B′ produces no output signal. The second difference circuit 37 thus determines the difference between (3/16)A±Z and zero, so that it produces an output signal having an amplitude level of (3/16)A±Z.

The signal (3/16)A±Z produced by the second difference circuit 37 is supplied to the third comparator 6C′, which compares said signal with the reference or comparison signal (1/8)A. Since (3/16)A±Z is greater in magnitude than (1/8)A, the third comparator 6C′ produces an output pulse or signal having an amplitude level of (1/8)A. A signal of (1/2)A and a signal of (1/8)A are thus simultaneously supplied to the adding circuit 21′, which adds them and produces a resultant sum signal of (5/8)A which is provided at the output terminal 25′. The first and second delay lines 19A′ and 19B′ function to supply the output signals of the first and second comparators 6A′ and 6B′ to the adding circuit 21′ simultaneously with the output signal of the third comparator 6C′.

Although a single modification of the embodiment of FIG. 4 has been illustrated with reference to FIG. 5, a number of modifications may be provided by substitution or replacement of components of either of the circuit arrangements of FIG. 4 or FIG. 5. Although the regenerative repeater of the present invention has been described with reference to an *n*-nary code which has signals having amplitude levels of $$0,\ \frac{1}{n}A,\ \frac{2}{n}A\ \ldots\ \frac{n-1}{n}A,$$

said regenerative repeater may obviously also function with *n*-nary codes which do not include the zero level. In such cases, it is necessary to adjust the magnitude of the bias amplitude by the signal biasing circuit 14 or 14′ and to additionally bias the last output pulse. When the intervals between the amplitude levels of the signals are not equal, the magnitude of the output pulse produced by the comparator must be suitably varied and the magnitude of the comparison or reference signal must also be suitably varied.

When the number of amplitude levels of the signals of the multinary code utilized in the transmission cannot be expressed in terms of 2*m*, such as 2, 4, 8, 16, the regenerative repeater may be modified. Thus, for example, if there are seven signal amplitude levels, the regenerative repeater may be constructed in essentially the same manner as when there are eight signal amplitude levels. When there are 13 signal amplitude levels, the regenerative repeater may be constructed in essentially the same manner as when there are 16 signal levels. By constructing the regenerative repeater of the present invention in the foregoing manner, it is possible to reduce the number of comparators or comparing circuits and other components from *n* or *n*−1 to *m*. The relation between *m* and *n* is then $2^{m11}<n\leqq 2^m$.

While the invention has been described by means of specific examples and in specific embodiments, we do not wish to be limited thereto, for obvious modifications will occur to those skilled in the art without departing from the spirit and scope of the invention.

We claim:

1. A regenerative repeater for a multivalued PCM system which transmits a multinary code having *n* signal amplitude levels, said regenerative repeater comprising
   *m* comparator means having *m* reference amplitude levels, wherein $$2^{m11}<n\leqq 2^m,$$

one of said comparator means including a comparator for comparing an input signal with a reference signal in amplitude level and producing an output signal in accordance with the amplitude level relationship of said input and reference signals;
   input means for supplying an input signal having a determined amplitude level and including noise to said comparator means; and
   outlet means connected to said comparator means for providing an output signal having said determined amplitude level and free of noise.

2. A regenerative repeater for a multivalued PCM system which transmits a multinary code having *n* signal amplitude levels, said regenerative repeater comprising
   a signal holding circuit for storing an input signal at constant amplitude for a determined time;

input means for supplying an input signal having a determined amplitude level and including noise to said signal holding circuit;

clock pulse generating means for producing a plurality of clock pulses having a repetition rate equal to that of said input signal and clock pulses having a repetition rate equal to $m+1$ times the repetition rate of said input signal, wherein $$2^{m11}<n\leqq 2^{m}$$

$m$ being a positive integer;

a comparison signal circuit coupled to said clock pulse generating means for producing a plurality of quantized signals within a predetermined level, each of said quantized signals comprising a comparison signal having an amplitude level determined by a clock pulse having a repetition rate which is $m+1$ times the repetition rate of said input signal, said comparison signal circuit initially producing a comparison signal of determined constant amplitude level;

a comparator having an input coupled to said signal holding circuit and to said comparison signal circuit for comparing the input signal stored in said signal holding circuit and a comparison signal produced by said comparison signal circuit in amplitude level and producing an output signal in accordance with the amplitude relationship of said input and comparison signals, said comparator having an output coupled to said comparison signal circuit for supplying the output signal of said comparator to said comparison signal circuit to control the production by said comparison signal circuit of a comparison signal having an amplitude level which is nearest that of said input signal in magnitude, said comparator comparing said input signal and a comparison signal $m$ times for a single input signal under the control of the clock pulses; and output means connected to said comparison signal circuit for providing an output signal having said determined amplitude level and free of noise.

3. A regenerative repeater for a multivalued PCM system which transmits a multinary code having $n$ signal amplitude levels, said regenerative repeater comprising input means for supplying an input signal having a determined amplitude level and including noise;

a signal biasing circuit connected to said input means for applying a constant amplitude level bias to said input signal;

$m$ circuit branches connected to said signal biasing circuit, wherein $$2^{m11}aAn\leqq 2^{m},$$

each of said circuit branches comprising a comparator for comparing an input signal with a comparison signal having a determined amplitude level and producing an output signal in accordance with the amplitude relationship of said input and comparison signals, the input signal to the comparator of the first of said circuit branches being the input signal supplied by said input means and biased by said signal biasing circuit, and each of said circuit branches other than said first comprising difference circuit means for determining the difference between the input signal supplied to the comparator of the next-preceding circuit branch and the output signal of the comparator of the next-preceding circuit branch, each of said difference circuit means having an output connected to the comparator of the corresponding circuit branch; and output means coupled in common to the comparator of each of said circuit branches for providing an output signal having said determined amplitude level and free of noise.

4. A regenerative repeater as claimed in claim 3, wherein the comparison signal with which the input signal is compared in the comparator of each of said circuit branches has an amplitude level which is different from those of the others.

5. A regenerative repeater as claimed in claim 3, wherein said output means comprises an adding circuit having a plurality of inputs each coupled to the comparator of a corresponding one of said circuit branches and an output providing said output signal, and delay means interposed between selected ones of said comparators and the corresponding inputs of said adding circuit.

6. A regenerative repeater as claimed in claim 3, wherein the difference circuit means of each of said circuit branches other than said first comprises a difference amplifier for determining the difference between the input signal supplied to the comparator of the next-preceding circuit branch and the output signal of the comparator of the next-preceding circuit branch and doubling the amplitude level of said difference.

7. A regenerative repeater as claimed in claim 3, wherein each of said circuit branches further comprises a signal holding circuit for storing the input signal supplied to the comparator of the corresponding circuit branch and to the difference circuit means of the next-succeeding circuit branch, the signal holding circuit of the first circuit branch being connected between said signal biasing circuit and the comparator of said first circuit branch and the signal holding circuit of each of the other circuit branches being connected between the difference circuit means and the comparator of the corresponding circuit branch.

8. A regenerative repeater as claimed in claim 3, wherein each of said circuit branches other than the first further comprises delay means connected in an input of the difference circuit means of the corresponding circuit branch for supplying the input signal simultaneously with the output signal of the comparator of the next-preceding circuit branch.

9. A regenerative repeater for a multivalued PCM system which transmits a multinary code having $n$ signal amplitude levels, said regenerative repeater comprising input means for supplying an input signal having a determined amplitude level and including noise;

a signal biasing circuit connected to said input means for applying a constant amplitude level bias to said input signal;

$m$ circuit branches connected to said signal biasing circuit, wherein $$2^{m11}aAn\leqq 2^{m},$$

each of said circuit branches comprising a comparator for comparing an input signal with a comparison signal having a determined amplitude level and producing an output signal in accordance with the amplitude relationship of said input and comparison signals, the input signal to the comparator of the first of said circuit branches being the input signal supplied by said input means and biased by said signal biasing circuit, and each of said circuit branches other than said first comprising difference circuit means for determining the difference between the input signal supplied to the comparator of the next-preceding circuit branch and the output signal of the comparator of the next-preceding circuit branch, each of said difference circuit means having an output connected to the comparator of the corresponding circuit branch, the comparison signal with which the input signal is compared in the comparator of each of said circuit branches having twice the amplitude level of the comparison signal of the next-preceding circuit branch; and output means coupled in common to the comparator of each of said circuit branches for providing an output signal having said determined amplitude level and free of noise.

10. A regenerative repeater as claimed in claim 9, wherein said output means comprises an adding circuit having a plurality of inputs each coupled to the comparator of a corresponding one of said circuit branches and an output providing said output signal, and delay means interposed between selected ones of said comparators and the corresponding inputs of said adding circuit, the difference circuit means of each of said circuit branches other than said first comprises a difference amplifier for determining the difference between the input signal supplied to the comparator of the next-preceding circuit branch and the output signal of the comparator of the next-preceding circuit branch and doubling the amplitude level of said difference, and each of said circuit branches further comprises a signal holding circuit for storing the input signal supplied to the comparator of the corresponding circuit branch and to the difference circuit means of the next-succeeding circuit branch, the signal holding circuit of the first circuit branch being connected between said signal biasing circuit and the comparator of said first circuit branch and the signal holding circuit of each of the other circuit branches being connected between the difference circuit means and the comparator of the corresponding circuit branch.

11. A regenerative repeater as claimed in claim 4, wherein each of said circuit branches other than the first further comprises delay means connected in an input of the difference circuit means of the corresponding circuit branch for supplying the input signal simultaneously with the output signal of the comparator of the next-preceding circuit branch.

12. A method of regeneratively repeating an input signal having a determined amplitude level and including noise in a multivalued PCM system which transmits a multinary code having *n* signal amplitude levels, said method comprising the steps of applying a constant amplitude level bias to the input signal;
comparing in each of *m* circuit branches, wherein $$2^{m11}aAn\leqq 2^{m},$$

an input signal with a comparison signal having a determined amplitude level and producing an output signal in accordance with the amplitude relationship of the input and comparison signals;

comparing in the first of the circuit branches the biased input signal;

determining in each of the circuit branches other than the first the difference between the input signal compared in the next-preceding circuit branch and the comparison output signal of the next-preceding circuit branch; and providing in common from the comparison output signals of all the circuit branches an output signal having the determined amplitude level and free of noise.

13. A method as claimed in claim 12, wherein the comparison signal of each of the circuit branches has an amplitude level which is different from those of the others.

14. A regenerative repeater for a multivalued PCM system which transmits a multinary code having *n* signal amplitude levels, said regenerative repeater comprising input means for supplying an input signal having a determined amplitude level and including noise;

a signal biasing circuit connected to said input means for applying a constant amplitude level bias to said input signal;

*m* circuit branches connected to said signal biasing circuit, wherein $$2^{m11}aAn\leqq 2^{m},$$

each of said circuit branches comprising a comparator for comparing an input signal with a comparison signal having a determined amplitude level and producing an output signal in accordance with the amplitude relationship of said input and comparison signals, the input signal to the comparator of the first of said circuit branches being the input signal supplied by said input means and biased by said signal biasing circuit, and each of said circuit branches other than said first comprising difference circuit means for determining the difference between the input signal supplied to the comparator of the next-preceding circuit branch and the output signal of the comparator of the next-preceding circuit branch, each of said difference circuit means having an output connected to the comparator of the corresponding circuit branch; and output means coupled in common to the comparator of each of said circuit branches for providing an output signal having said determined amplitude level and free of noise, said output means comprising an adding circuit having a plurality of inputs each coupled to the comparator of a corresponding one of said circuit branches and an output providing said output signal, and attenuating means connected in each input of said adding circuit other than the first for attenuating signals supplied to said adding circuit by $\frac{1}{2}^{x}$, where *x* is an integer which is 1 in the second circuit branch and increases by 1 in each succeeding circuit branch.

15. A method of regeneratively repeating an input signal having a determined amplitude level and including noise in a multivalued PCM system which transmits a multinary code having *n* signal amplitude levels, said method comprising the steps of applying a constant amplitude level bias to the input signal;
comparing in each of *m* circuit branches, wherein $$2^{m11}aAn\leqq 2^{m},$$

an input signal with a comparison signal having a determined amplitude level and producing an output signal in accordance with the amplitude relationship of the input and comparison signals, the comparison signals in each of the circuit branches having twice the amplitude level of the comparison signal of the next-preceding circuit branch;

comparing in the first of the circuit branches the biased input signal;

determining in each of the circuit branches other than the first the difference between the input signal compared in the next-preceding circuit branch and the comparison output signal of the next-preceding circuit branch; and providing in common from the comparison output signals of all the circuit branches an output signal having the determined amplitude level and free of noise.